(12) United States Patent
Leccia et al.

(10) Patent No.: US 6,746,092 B2
(45) Date of Patent: Jun. 8, 2004

(54) APPARATUS FOR SECURING A DOOR OF AN ARC-RESISTANT SWITCHGEAR CABINET

(75) Inventors: Brad R. Leccia, Bethel Park, PA (US); Mary Beth Hill, Pittsburgh, PA (US)

(73) Assignee: Eaton Corporation, Cleveland, OH (US)

(*) Notice: Subject to any disclaimer, the term of this patent is extended or adjusted under 35 U.S.C. 154(b) by 174 days.

(21) Appl. No.: 10/074,963

(22) Filed: Feb. 13, 2002

(65) Prior Publication Data

US 2003/0151337 A1 Aug. 14, 2003

(51) Int. Cl.$^7$ ................................. E05C 7/06
(52) U.S. Cl. .................. 312/222; 312/326; 292/300
(58) Field of Search ................. 248/219.3, 219.1; 312/257.1, 265.1, 265.2, 265.4, 222, 109, 216, 326; 49/15; 292/300, 302, 340, 158, 161, 137–162

(56) References Cited

U.S. PATENT DOCUMENTS

| | | | | |
|---|---|---|---|---|
| 2,340,487 A | * | 2/1944 | Paquette | 248/219.1 |
| 5,408,725 A | * | 4/1995 | Wolanin | 16/239 |
| 5,503,439 A | * | 4/1996 | LaJeunesse et al. | 292/44 |
| 5,641,215 A | * | 6/1997 | Pochet | 312/109 |
| 5,905,244 A | | 5/1999 | Smith et al. | |
| 6,061,966 A | * | 5/2000 | Nelson et al. | 49/394 |

FOREIGN PATENT DOCUMENTS

| | | | | |
|---|---|---|---|---|
| CH | 598703 A | * | 5/1978 | |
| EP | 000062241 A1 | * | 10/1982 | 312/294 |

* cited by examiner

Primary Examiner—Lanna Mai
Assistant Examiner—Hanh V. Tran
(74) Attorney, Agent, or Firm—Martin J. Moran (57) ABSTRACT

A switchgear cabinet includes a plurality of securing apparatuses that are mounted on a vertical flange of the switchgear cabinet, with the securing apparatuses each being formed with a locking hole that is engageable by a pin of a locking mechanism on a door member. Each securing apparatus includes an anchor plate connected with a first bracket and a second bracket, with the first and second brackets being mounted on the flange of the switchgear cabinet. The locking hole is formed in the anchor plate, and the anchor plate is substantially planar and free of bends. The anchor plate further is generally U-shaped and is configured to extend generally around at least a portion of the flange.

2 Claims, 7 Drawing Sheets

APPARATUS FOR SECURING A DOOR OF AN ARC-RESISTANT SWITCHGEAR CABINET

BACKGROUND OF THE INVENTION

1. Field of the Invention

The present invention relates generally to power distribution equipment and, more particularly, to a switchgear cabinet within which circuit breakers and the like can be disposed and that is configured to resist unintended opening in the event of an arc fault or other fault.

2. Description of the Related Art

Metal-clad switchgear is desirably employed for medium voltage switchgear operating at voltages from 5 to 38 KV, and for even higher voltages. The design of such metal-clad switchgear typically concentrates on structures that reduce the possibility of arcing faults within the enclosure. For instance, all primary elements such as breakers, voltage transformers, and control power transformers have disconnect means with isolating shutters to establish isolation from high voltage sources. All operations on breakers and the like disposed within metal-clad switchgear are preferably performed with the compartment doors closed for operator safety. The front door may be interlocked with the shutter assembly to reduce the chance of accidental opening of the front door during partial levering-in of the circuit breaker or other equipment.

The switchgear enclosures that contain the primary elements of the power distribution system such as the circuit breaker compartment, the main bus compartment, and the cable compartment have been compartmentalized and grounded for maximum isolation and confinement within these compartments, and all live parts where possible are fully isolated to reduce the likelihood of an arcing fault.

Although arcing faults are rare, injuries from arcing faults in metal-clad switchgear nevertheless may occur. Arcing faults are very destructive due to the high energy levels reach within the confined compartment. The structural containment must be adequate to substantially prevent the escape of arcing products and hot gases from the faulted compartment. Burns can result if operating personnel are in close proximity with the faulted switchgear.

Arcing faults can occur within a switchgear compartment as a result of insulation failure or human error. The pressure from an electric arc is developed from two sources: the expansion of the metal by boiling, and the heating of air by arc energy. Copper expands by a factor of 67,000 times in vaporizing. This accounts for the expulsion of near-vaporized droplets of molten metal from the arc. One test has shown that droplets could be propelled up to ten feet. The pressure also generates and directs plasma outward from the arc for distances proportional to the arc energy. One cubic inch of copper vaporizes into 1.44 cubic yards of vapor. The air in the arc stream expands due to its being heated from ambient temperature to the temperature of the arc (approximately 35,000° F.).

All of this happens within the first half cycle of the fault and results in a sudden and dramatic increase in pressure within the compartment. Such elevated pressure acting on the door of the faulted compartment can potentially generate sufficient force to blow the door off the cabinet. Switchgear cabinetry thus must be designed not only to reduce the likelihood of arcing but also to contain and withstand the pressures that are created during such arcing in order to prevent personal injury.

Switchgear can be designed in numerous ways to retain the door thereon and to resist the door from being blown open or off during an arcing fault. Some such doors have included overlapping or interlocking members around the perimeter of the door that operate as interference structures that interfere with movement of the door away from the frame of the switchgear cabinet and thus help to secure the door to the frame.

In one type of switchgear cabinet, it has been known to provide a locking mechanism on a door of a cabinet that includes a plurality of latches that are simultaneously operated by an operating rod connected with a handle. The latches each include a pin, and the pins are selectively engaged with holes formed in plates that are bolted or otherwise mounted to a vertical frame member of the switchgear cabinet. Such plates have, however, previously been configured to each include a bend that defines a protruding lug within which the hole is formed. Such a configuration is necessitated by the desire to simultaneously operate the latches to allow simultaneous engagement of the pins in the holes. A noted shortcoming with such a configuration has been that the plates have tended to fail by catastrophic rupture at the bend in the event of an arc fault or other fault. It thus is desired to provide an improved switchgear cabinet that permits the use of a plurality of vertically spaced latches on a door that are simultaneously operated with an operating rod, but in which the plates with which the pins of the latches are engaged are not formed with a bend and thus are relatively more resistant to catastrophic failure in the event of an arcing fault or other fault.

SUMMARY OF THE INVENTION

In view of the foregoing, a switchgear cabinet includes a plurality of securing apparatuses that are mounted on a vertical flange of the switchgear cabinet, with the securing apparatuses each being formed with a locking hole that is engageable by a pin of a locking mechanism on a door member. Each securing apparatus includes an anchor plate connected with a first bracket and a second bracket, with the first and second brackets being mounted on the flange of the switchgear cabinet. The locking hole is formed in the anchor plate, and the anchor plate is substantially planar and free of bends. The anchor plate further is generally U-shaped and is configured to extend generally around at least a portion of the flange.

An aspect of the present invention is to provide an improved securing apparatus for a switchgear cabinet in which the securing apparatus is more resistant to catastrophic failure in the event of an arcing fault than previously known securing structures.

Another aspect of the present invention is to provide a securing apparatus for a switchgear cabinet in which the securing apparatus includes an anchor plate that is substantially planar and free of bends.

Another aspect of the present invention is to provide an improved securing apparatus for a switchgear cabinet that is co-operable with a locking mechanism mounted on a door member of the switchgear cabinet, with the locking mechanism being of a type that includes a plurality of vertically spaced latches that are simultaneously operated by a common operating rod.

Another aspect of the present invention is to provide a securing apparatus for a switchgear cabinet, in which the securing apparatus includes an anchor plate that is of a generally U-shaped configuration and that extends generally around at least a portion of a flange of the switchgear cabinet.

Accordingly, an aspect of the present invention is to provide a securing apparatus for use in a switchgear cabinet, the switchgear cabinet including a case and a pin, in which the general nature of the securing apparatus can be generally stated as including an anchor plate formed with a slot and a locking hole, the slot being structured to receive at least a portion of the case therein, the locking hole being structured to receive at least a portion of the pin therein, and a support connected with the anchor plate and structured to be mounted on a portion of the case.

The support may include a first bracket and a second bracket. The first and second brackets may be disposed on opposite sides of the slot, and the first and second brackets may each include a flange plate, with the flange plates being oriented substantially parallel with one another and being structured to receive the flange therebetween.

The anchor plate may include a base plate, a first tab, and a second tab, with the first and second tabs extending from the base plate and being disposed on opposite sides of the slot, and with the base plate and the first and second tabs together being of a generally U-shaped configuration. The locking hole may be formed in the first tab, and the base plate and first tab may be substantially free of bends.

Another aspect of the present invention is to provide a switchgear cabinet, the general nature of which can be stated as including a case, a door that is movable with respect to the case, and at least a first securing apparatus, the at least first securing apparatus being disposed on a portion of the case, the door including at least a first pin, the at least first securing apparatus including an anchor plate and a support, the anchor plate being formed with a slot and a locking hole, the portion of the case being received in the slot, and at least a portion of the at least first pin being receivable in the locking hole, the at least first securing apparatus being structured to resist movement of the door with respect to the case when at least a portion of the at least first pin is received in the locking hole, and the support being connected with the anchor plate and being mounted on the portion of the case. The securing apparatus may include additional features as set forth in the paragraphs above.

BRIEF DESCRIPTION OF THE DRAWINGS

A further understanding of the invention can be gained from the following description of the preferred embodiments when read in conjunction with the accompanying drawings in which.

Similar numerals refer similar to parts throughout the specification.

DESCRIPTION OF THE PREFERRED EMBODIMENTS

A switchgear cabinet 4 in accordance with the present invention is indicated in whole or in part in FIGS. 1–8. The switchgear cabinet 4 includes a case 8, a front door 12, and a rear door 16, with the front and rear doors 12 and 16 being hingedly mounted on opposite sides of the case 8. The switchgear cabinet 8 is configured to receive therein various components of power distribution equipment and is advantageously configured to resist either of the front and rear doors 12 and 16 from being unintentionally partially or fully opened in the event of an arcing or other fault within the switchgear cabinet 4.

The switchgear cabinet 4 advantageously further includes a plurality of securing apparatuses 20 (FIG. 3) and a plurality of securing apparatuses 220 (FIG. 7) disposed on the case 8. The securing apparatuses 20 can be engaged by portions of the front door 12, as will be set forth more fully below, in order to resist the front door 12 from being blown off the case 8 in the event of an arcing fault. The securing apparatuses 220 are similarly co-operable with portions of the rear door 16 to resist the rear door 16 from being similarly blown off.

Figure 1:
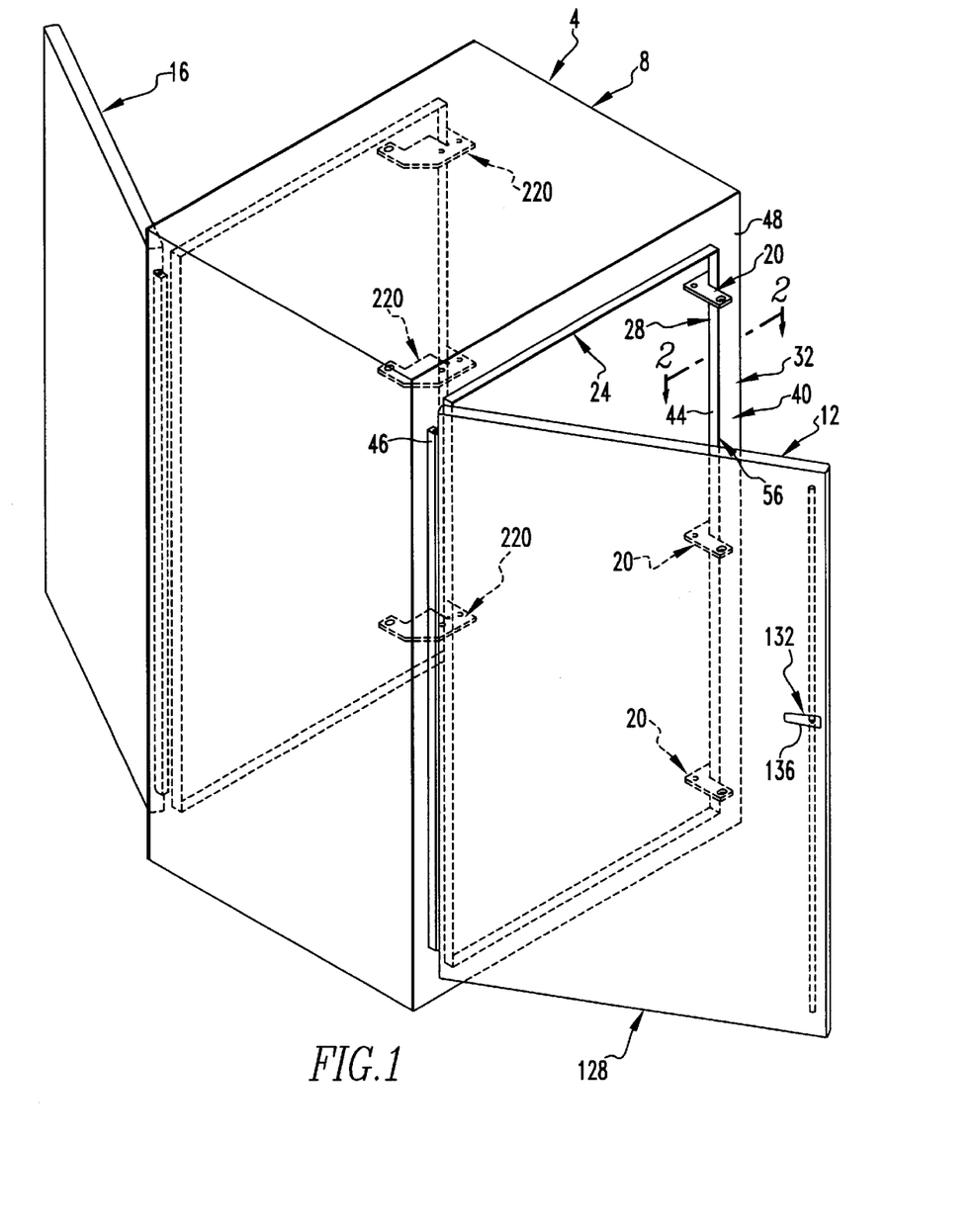
FIG. 1 is a schematic isometric view of a switchgear cabinet in accordance with the present invention, with the switchgear cabinet including at least a first securing apparatus in accordance with a first embodiment of the present invention.
Figure 2:
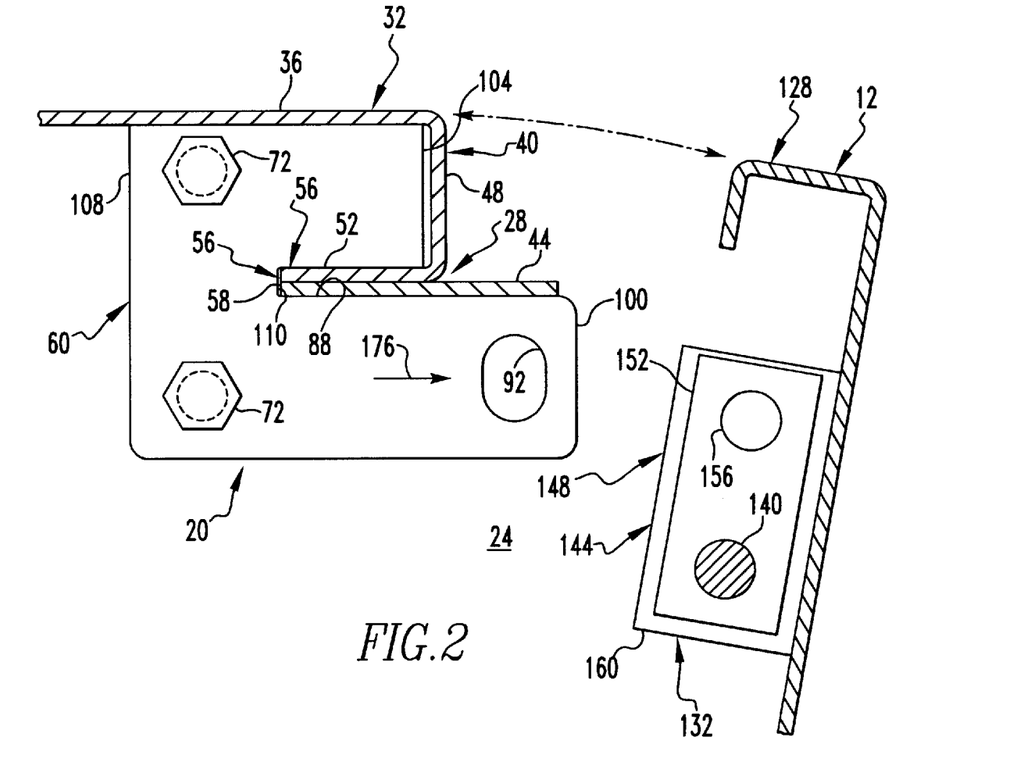
FIG. 2 is a sectional view as taken along line 2—2 of FIG. 1 and additionally depicts a portion of a door of the switchgear cabinet.
Figure 6:
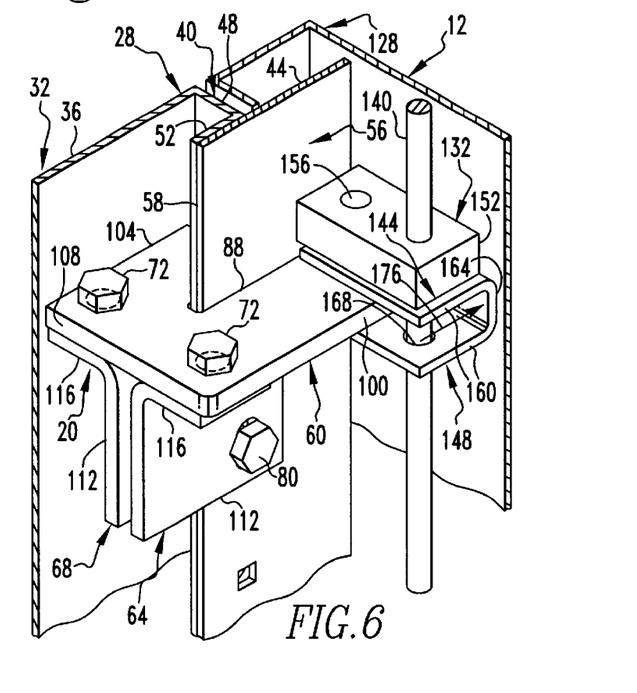
FIG. 6 is a view similar to FIG. 5, except depicting the locking mechanism in a locked position.

The case 8 is formed with a large frontal opening 24 that is at least partially defined by at least a first frame component 28 (FIG. 2). The frame component 28 includes a reentrantly configured side member 32 and a seal plate 44 disposed adjacent one another. The front door 12 covers and seals the frontal opening 24 when the door 16 is in a closed position (FIG. 6). The frame component 28 is disposed on the case 8 substantially opposite a front hinge 46 that hingedly connects the front door 12 with the case 8.

As can be best seen from FIG. 2, the side member 32 includes a generally planar side sheet 36 and an L-shaped front portion 40 that is configured in a reentrant fashion with respect to the side sheet 36. The front portion 40 includes a facing plate 48 and a lip 52 that are oriented substantially perpendicular to one another. The lip 52 and the seal plate 44 are disposed flush against one another and together form a flange 56 to which the securing apparatuses 20 are mounted. The edges of the lip 52 and the seal plate 44 together form a free edge 58 of the flange 56.

The lip 52 and the seal plate 44 may be fixedly connected with one another to form the flange 56. As will be set forth more fully below, the configuration of the flange 56 and the securing apparatuses 20, as well as their cooperative interaction, advantageously resist undesired detachment of the front door 12 from the case 8 in a heretofore unknown fashion.

Figure 3:
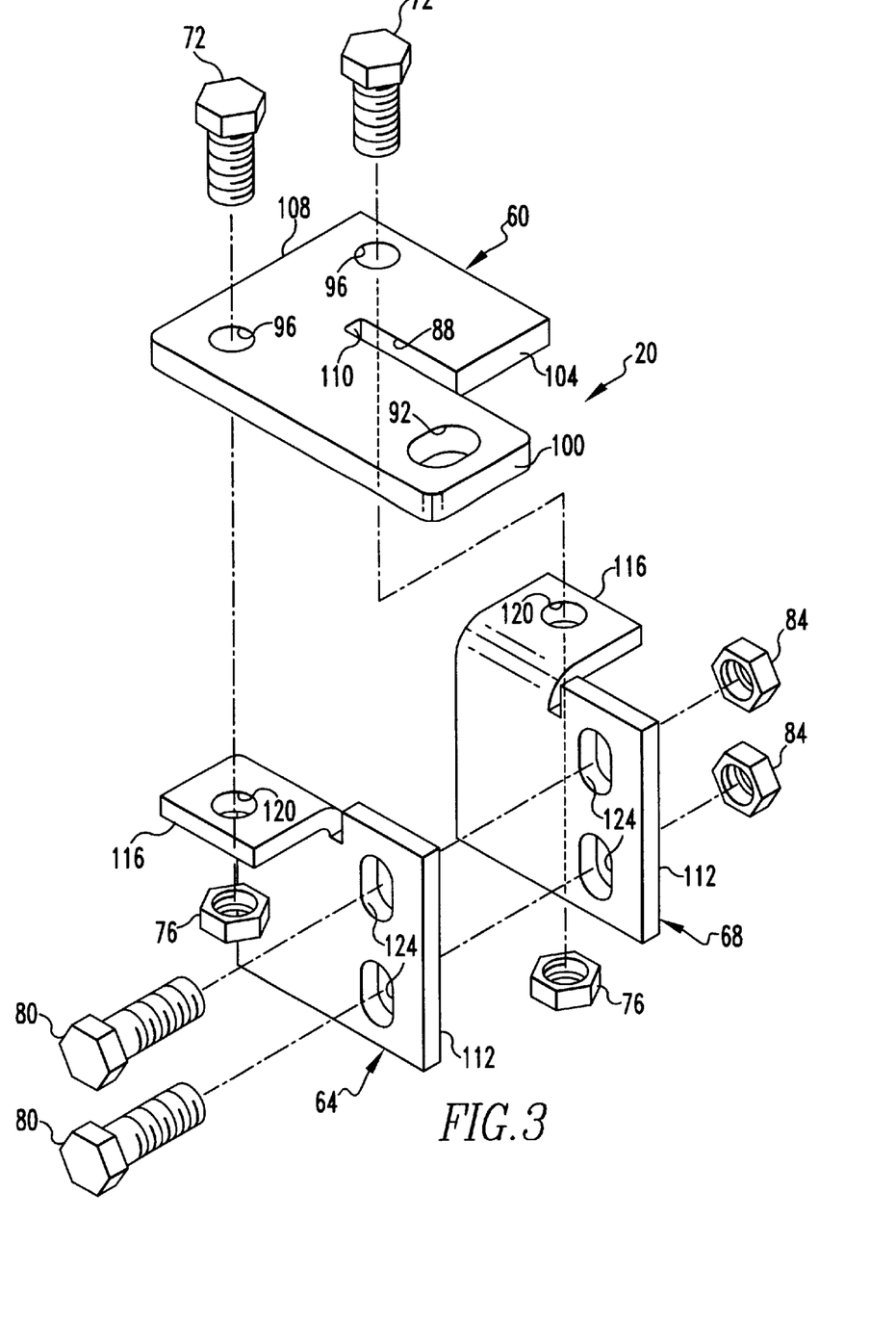
FIG. 3 is an exploded isometric view of the first embodiment.

As is best shown in FIG. 3, each securing apparatus 20 includes an anchor plate 60, a first bracket 64, and a second bracket 68. The first and second brackets 64 and 68 function as a support for supporting the anchor plate 60 on the case 8.

The first and second brackets 64 and 68 are each mounted on the anchor plate 60 with an upper bolt 72 and an upper nut 76 that are threadably co-operable with one another. The first and second brackets 64 and 68 are additionally mounted on the flange 56 (not shown in FIG. 3) with a pair of lower bolts 80 and a pair of lower nuts 84 that are threadably co-operable with one another. It can be seen that the anchor plate 60 is substantially planar and free of bends, and it can further be seen that the first and second brackets 64 and 68 are mirror images of one another and are each generally L-shaped.

The anchor plate 60 includes a narrow slot 88 as well as a locking hole 92 and a pair of first bolt holes 96 formed therein. Moreover, the anchor plate 60 includes a first tab 100, a second tab 104, and a base plate 108 that are generally defined by the slot 88. The slot 88 is a blind slot that terminates at a terminus 110.

The first and second tabs 100 and 104 are disposed on opposite sides of the slot 88 and are both connected with the base plate 108. The anchor plate 60 may be a monolithically-formed single piece member. The first and second tabs 100 and 104 and the base plate 108 are together generally of a U-shaped configuration that extends about the slot 88.

It can be seen that the first bolt holes 96 are formed in the base plate 108. Additionally, the locking hole 92 is formed in the first tab 100. It can further be seen that the first tab 100 is longer than the second tab 104, and in the exemplary securing apparatus 20 depicted generally in FIG. 3 the locking hole 92 is formed in the portion of the first tab 100 that protrudes past the second tab 104.

The first and second brackets 64 and 68, as indicated above, are mirror images of one another, and thus while being different will nevertheless be described herein as being substantially similar to one another. The first and second brackets 64 and 68 each include a flange plate 112 and a connection plate 116 that are connected with one another and are oriented substantially perpendicular to one another. Each flange plate 112 includes a second bolt hole 120 formed therein, and each connection plate 116 includes a pair of third bolt holes 124 formed therein. It can be seen from FIG. 3 that the third bolt holes 124 are advantageously elongated to permit some adjustment of the securing apparatus 20 in a direction parallel with the elongated dimension of the third bolt holes 124, which in the embodiment of the switchgear cabinet 4 depicted in the accompanying figures is in a substantially vertical direction.

Figure 4:
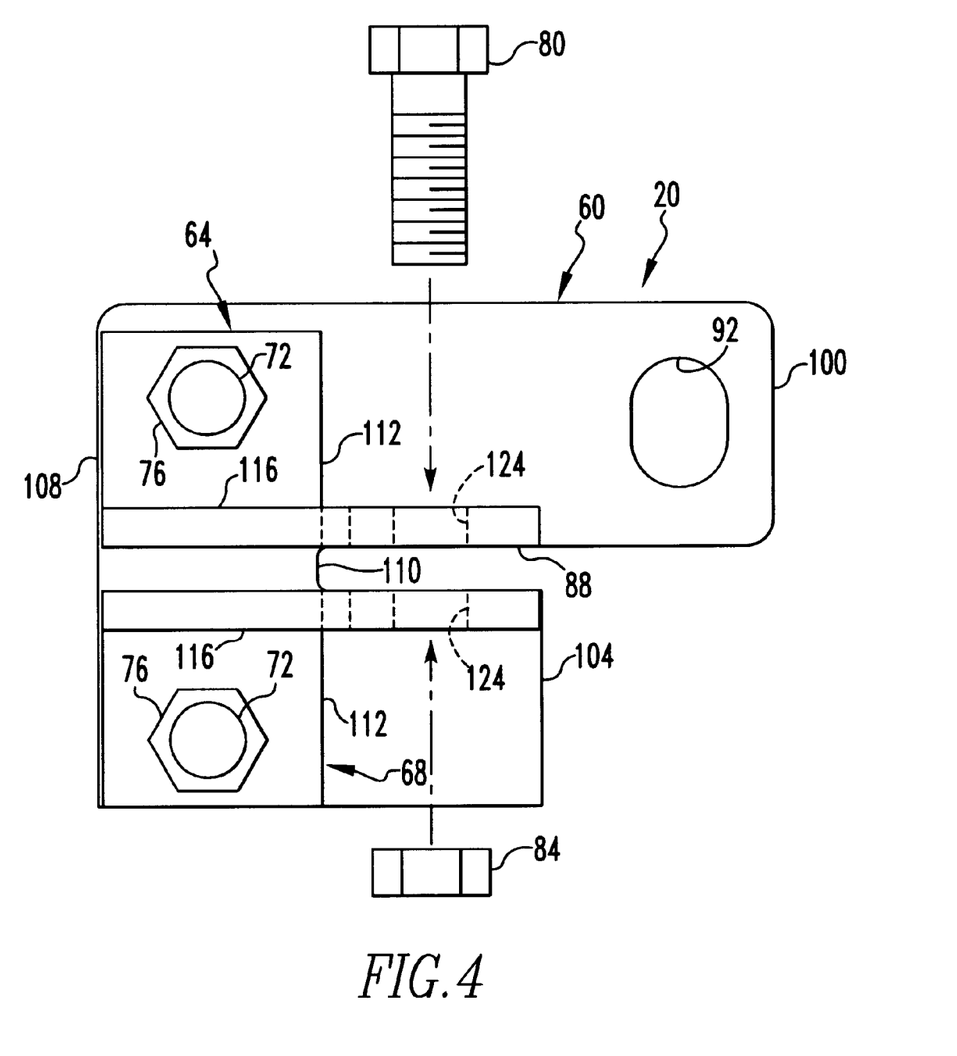
FIG. 4 is a bottom view of the assembled first embodiment.

As can be understood from FIGS. 2–4, the upper bolts 72 are receivable through the first and second bolt holes 96 and 120 to connect the first and second brackets 64 and 68 with the base plate 108 of the anchor plate 60. As can be understood from FIG. 4, when the first and second brackets 64 and 68 are mounted on the anchor plate 60, a portion of the first bracket 64 extends along at least a portion of the first tab 100 adjacent the slot 88, and a portion of the second bracket 68 extends along at least a portion of the second tab 104 adjacent the slot 88. Since the first and second brackets 64 and 68 are mirror images of one another, and since the first tab 100 is longer than the second tab 104, at least a portion of the first tab 100 protrudes beyond the first bracket 64. Since the connection plates 116 extend along the slot 88 on opposite sides thereof, it can correspondingly be seen that the connection plates 116 are spaced apart from one another by a distance substantially equal to the width of the slot 88.

Figure 5:
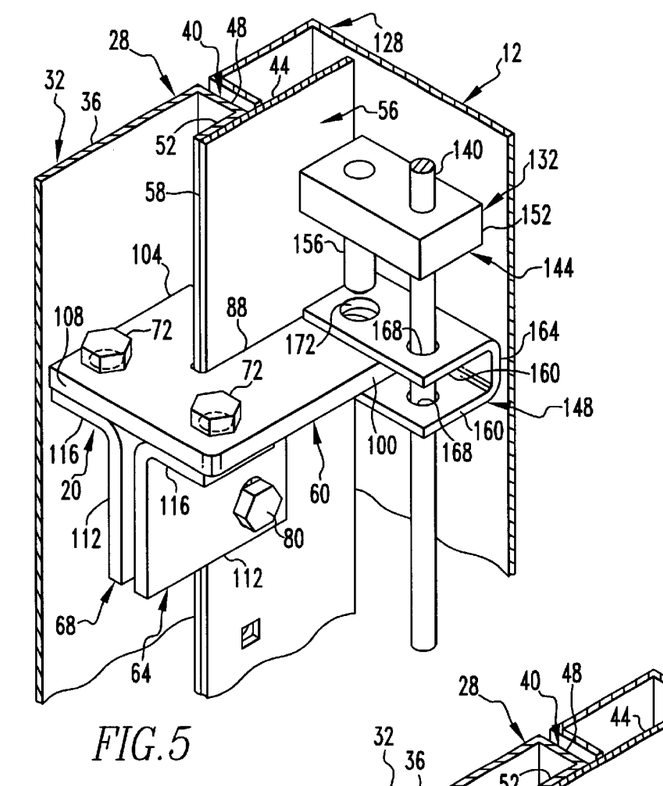
FIG. 5 is an isometric view from within the switchgear cabinet of the first embodiment and a portion of the door, with a locking mechanism of the door being in an unlocked position.

It can be understood from FIGS. 2, 5, and 6 that a portion of the flange 56 is received in the slot 88 and between the connection plates 116 of the first and second brackets 64 and 68 of each securing apparatus 20. While it is understood that a plurality of the securing apparatuses 20 are disposed on the flange 56 in order to secure the front door 12 in a closed condition, only a single securing apparatus 20 is depicted in FIGS. 2, 5, and 6 for purposes of clarity.

Most configurations of the switchgear cabinet 4 will include one of the securing apparatuses 20 at each of the upper and lower ends of the frame component 28, as well as one or more of the securing apparatuses 20 disposed between the upper and lower ends of the frame component 28 depending upon the size of the frontal opening 24. The securing apparatuses 20 may be spaced approximately 50 centimeters apart from one another along the frame component 28, and may be spaced a greater or lesser distance depending upon the sizes of the frame component 28 and frontal opening 24.

As can be understood from FIGS. 5 and 6, the securing apparatus 20 is mounted on the flange 56 by receiving the lower bolts 80 through the third bolt holes 124 of the connection plates 116 as well as through correspondingly positioned holes (not shown) formed in the seal plate 44 and the lip 52. It thus can be seen that the first and second brackets 64 and 68 are mounted on the flange 56 and that the anchor plate 60 is, in turn, mounted on the first and second brackets 64 and 68. It can be further understood from FIG. 2 that when the securing apparatus 20 is mounted on the flange 56, the anchor plate 60, being of a generally U-shaped configuration, extends at least partially around the flange 56, meaning that the first and second tabs 100 and 104 are disposed on opposite sides of the flange 56.

When the securing apparatus 20 is mounted on the flange 56 the terminus 110 of the slot 88 seats against the free edge 58 of the flange 56. As such, the anchor plate 60 can be said to be mounted on the flange 56 both with the first and second brackets 64 and 68 as well as with the engagement of the terminus 110 with the free edge 58. It is noted that the free edge 58 is depicted in FIG. 2 as being spaced from the terminus 110, and such spacing represents an exaggeration of a tiny space that may exist in such position.

As can be understood from FIGS. 1, 2, 5, and 6, the front door 12 includes a door member 128 and a locking mechanism 132. The door member 128 is hingedly connected to the case 8 with the front hinge 46, and it will be understood that the locking mechanism 132 is disposed generally opposite the front hinge 46. The door member 128 includes a generally planar panel 130 upon which the locking mechanism 132 is mounted.

The locking mechanism 132 includes a handle 136 (FIG. 1), an operating rod 140 (FIGS. 1, 5, and 6), and a plurality of latches 144 (FIGS. 5 & 6) mounted on the operating rod 140. The handle 136 is operatively connected with the operating rod 140 such that the handle 136, by movement of the operating rod 140, simultaneously operates all of the latches 144. The locking mechanism 132 includes one latch 144 for each securing apparatus 20. For purposes of clarity, it is understood that only a single latch 144 is depicted in FIGS. 5 and 6.

Each latch 144 includes a channel member 148, a block 152, and a pin 156. The channel member 148 is mounted on the panel 130 of the door member 128. The block 152 is mounted on the operating rod 140, and the pin 156 is mounted on the block 152. As can be understood from FIG. 5, the channel member 148 includes a pair of wings 160 that are oriented generally parallel with one another and are disposed at opposite sides of a center plate 164. The wings 160 each include an operating hole 168 and a pin hole 172 formed therein. The operating rod 140 is slidably disposed in the operating holes 168, and the pin 156 is slidably receivable in the pinholes 172. As can be understood from FIG. 5, the pinholes 172 are aligned with the locking hole 92 of the anchor plate 60 when the front door 12 is in the closed position.

As can further be understood from FIGS. 5 and 6, the locking mechanism 132 is movable between an unlocked position (FIG. 5) and a locked position (FIG. 6). The pins 156 in the unlocked position are disengaged from the locking holes 92 and the pin holes 172. When the locking mechanism 132 is in the locked position the pins 156 are disposed in the locking holes 92 and the pin holes 172, thus resisting movement of the front door 12 away from the closed position.

When the front door 12 is in the closed position and the locking mechanism 132 is in the locked position, as is generally depicted in FIG. 6, a fault such as an arcing fault will result in application of a pressure to the panel 130 of the door member 128 such that forces are imparted to the securing apparatus 20 in a direction generally parallel with the arrow 176. The first tab 100 is oriented generally parallel with the arrow 176. Forces applied to the first tab 100 by the pin 156 received in the locking hole 92 will not result in a concentration of forces at any bend in the anchor plate 60 with a potential for catastrophic failure at such a bend since the anchor plate 60 is configured to be generally planar and thus substantially free of bends.

In this regard, it can be understood that forces which may be applied to the securing apparatus 20 in the direction of the arrow 176 as a result of an arcing or other fault will result in the application of reaction forces to the flange 56 along the axis of the greatest moment of inertia of the flange 56, which will thus generally resist bending of the flange 56 along that axis. Since the flange 56 is connected with the facing plate 48, and since the locking hole 92 is spaced from the flange 56, forces applied to the locking hole 92 will additionally result in a torque being applied to the front portion 40 which causes a flexing rotation of the front portion 40 about a longitudinal axis of the flange 56. Such flexing rotation causes the facing plate 48 to further engage the front door 12, thus providing in a relatively greater seal therebetween in the event of an arcing or other fault, which resists the flow of gases and metal past the door 12.

By configuring the anchor plate 60 to extend at least partially around the flange 56 and by connecting the anchor plate 60 to the flange 56 via the first and second brackets 64 and 68, the anchor plate 60 is extremely unlikely to become dislodged or otherwise detached from the flange 56 in the event of an arcing or other fault. It thus can be seen that the securing apparatus 20 is advantageously configured to resist unintended opening of the front door 12 in the event of an arcing or other fault.

Figure 7:
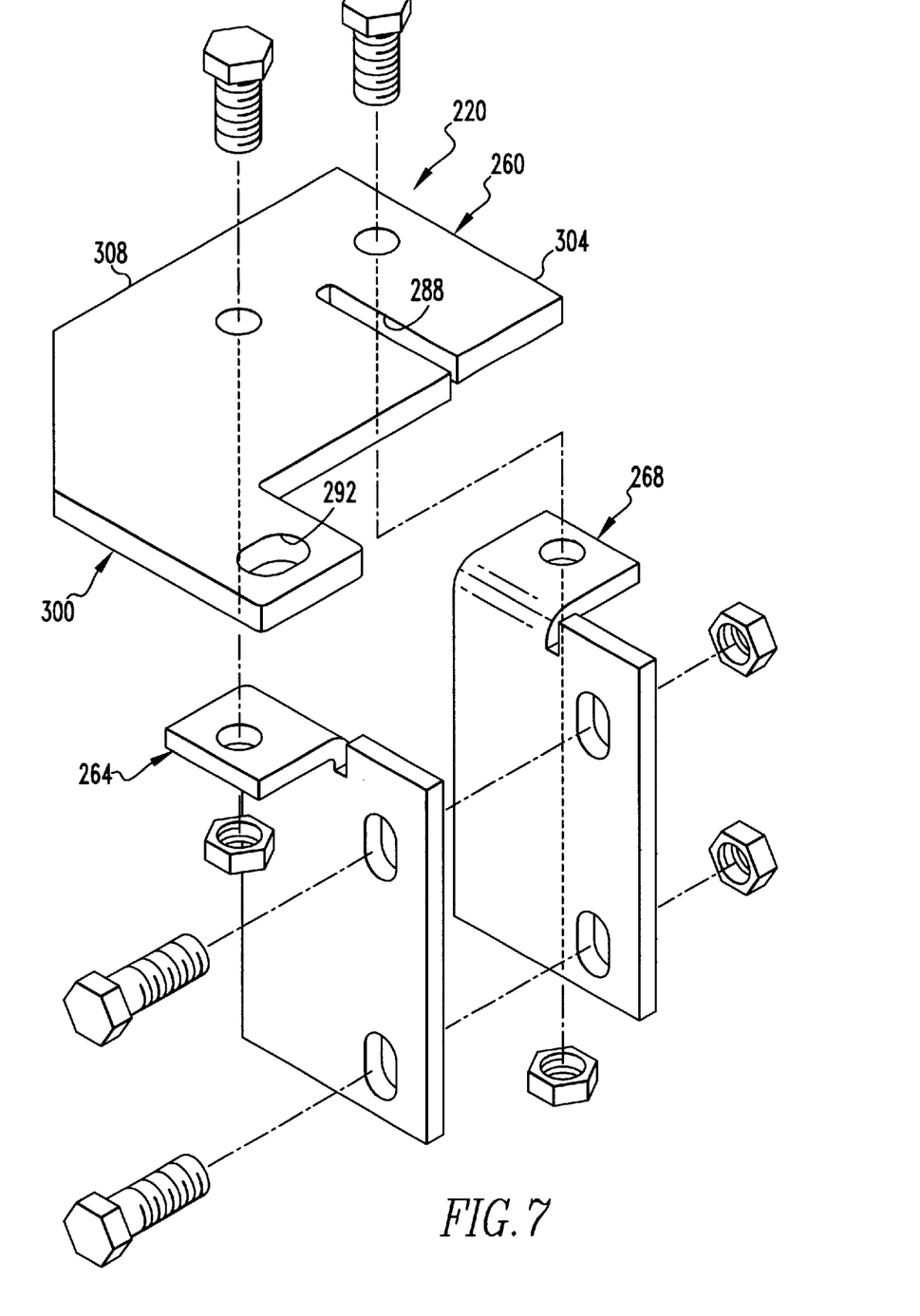
FIG. 7 is an exploded isometric view of a securing apparatus in accordance with a second embodiment of the present invention.
Figure 8:
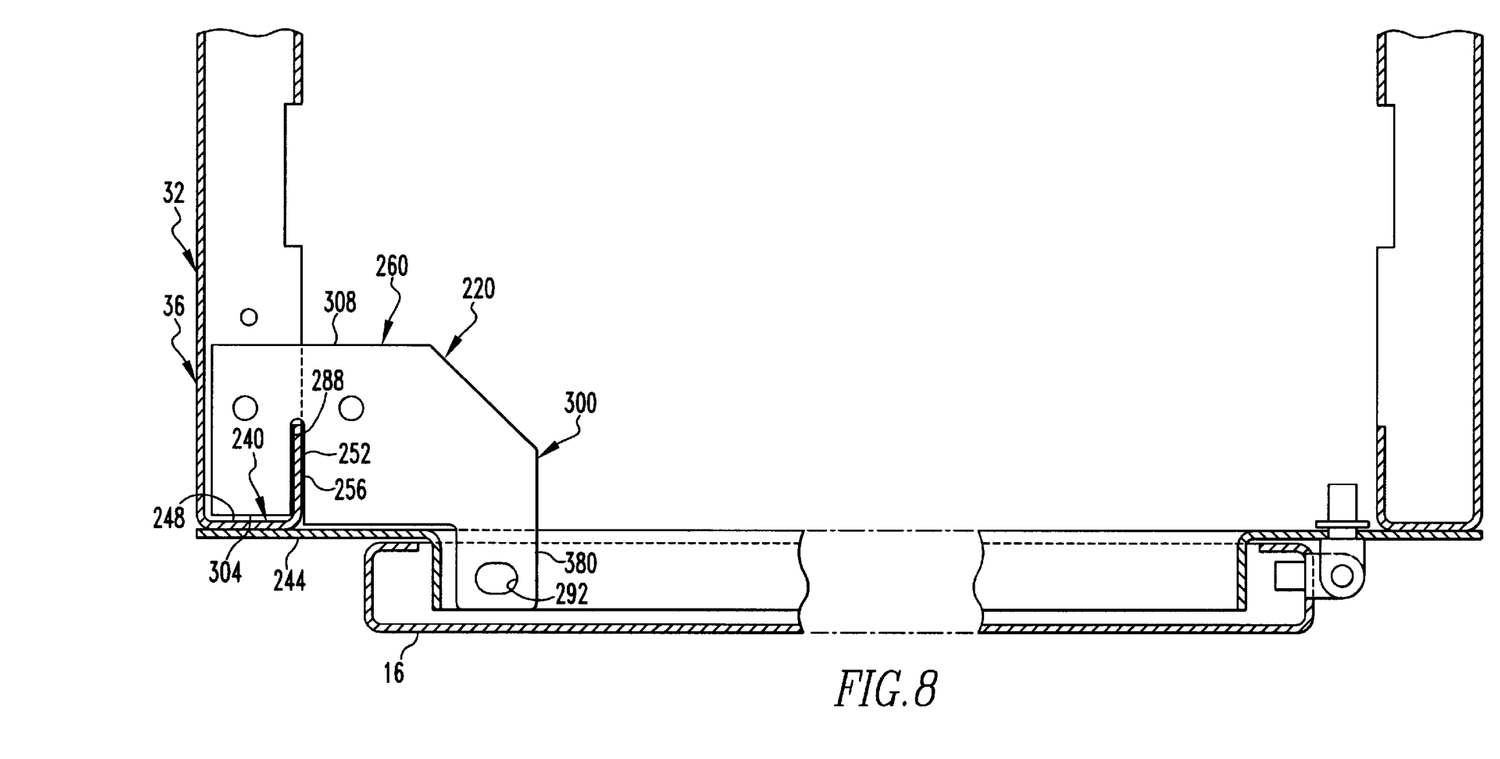
FIG. 8 is a top plan view, partially cut away, of a portion of the switchgear cabinet and including the second embodiment.

As can be seen in FIGS. 7 and 8, the securing apparatuses 220 are substantially similar to the securing apparatuses 20 except are of a slightly different shape. More specifically, the securing apparatuses 220 each include an anchor plate 260, a first bracket 264, and a second bracket 268 that are similarly mounted together with bolts or other appropriate fasteners. The anchor plate 260 is a generally planar member including a slot 288 formed therein, with the slot 288 defining a first tab 300, a second tab 304, and a base plate 308. It can be seen that the first tab 300 includes a locking hole 292 formed therein. The locking hole 292 is spaced farther away from the slot 288 than the locking hole 92 is spaced from the slot 88. Moreover, the first tab 300 is sized substantially larger than the first tab 100. While the first and second brackets 264 and 268 are mirror images of one another, the first and second brackets 264 and 268 are of a slightly different configuration than the first and second brackets 64 and 68.

As can be understood from FIG. 8, the frame component 28 additionally includes a reentrantly formed rear portion 240 opposite the front portion 40 and connected with the side sheet 36. The rear portion 240 includes a facing plate 240 and a lip 252, with the lip 252 forming a flange 256 upon which the securing apparatuses 220 are mounted. The case 8 additionally includes an L-shaped seal plate 244 that is mounted on the facing plate 248.

It can be seen that the first tab 300 includes an ear 380 that protrudes past the second tab 304 and extends in a direction generally parallel with the slot 288. The locking hole 292 is formed in the ear 380. It can further be seen that a portion of the seal plate 244 is disposed adjacent one side of the ear 380.

The securing apparatuses 220 are mounted to the flange 256 in a fashion similar to the attachment of the securing apparatuses 20 to the flange 56, meaning that the first and second brackets 264 and 268 are mounted directly to the flange 256, and that the anchor plate 260 is, in turn, mounted to the first and second brackets 264 and 268. The anchor plate 260 is substantially planar and free of bends such that the explosive forces of an arcing or other fault will not result in a concentration of forces at a bend in the anchor plate 260 or any catastrophic failure at any such bend.

The first and second tabs 300 and 304 and the base plate 308 are together generally U-shaped in configuration and extend at least partially around the flange 256. The securing apparatuses 220 are spaced from one another and are positioned on the flange 256 in a fashion similar to the positioning of the securing apparatuses 20 on the flange 56. The rear door 16 includes a locking mechanism similar to the locking mechanism 132 on the front door 12.

In thus can be seen that while the securing apparatus 220 is slightly different than the securing apparatus 20, the securing apparatuses 20 and 220 are generally of a similar configuration. Accordingly, the securing apparatuses 220 resist unintended opening of the rear door 16 in the event of an arcing or other fault in a fashion similar to the protection provided by the securing apparatuses 20 to the front door 12.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A securing apparatus for use in a switchgear cabinet, the switchgear cabinet including a case and a pin, the securing apparatus comprising:

an anchor plate formed with a slot and a locking hole;

the slot being structured to receive at least a portion of the case therein;

the locking hole being structured to receive at least a portion of the pin therein; and a support connected with the anchor plate and structured to be mounted on a portion of the case;

the case including a flange;

the support including a first bracket and a second bracket;

the first and second brackets each being connected with the anchor plate;

the first and second brackets each structured to be mounted on the flange;

the first and second brackets being disposed on opposite sides of the slot;

the first and second brackets each including a flange plate;

the flange plates being oriented substantially parallel with one another and being structured to receive the flange therebetween;

the first and second brackets each including a connection plate;

the connection plate of each of the first and second brackets being oriented substantially perpendicular to the flange plate thereof; and the connection plates being fixedly mounted on the anchor plate.

2. A switchgear cabinet comprising:

a case;

a door;

the door being movable with respect to the case;

at least a first securing apparatus;

the at least first securing apparatus being disposed on a portion of the case;

the door including at least a first pin;

the at least first securing apparatus including an anchor plate and a support;

the anchor plate being formed with a slot and a locking hole;

the portion of the case being received in the slot;

at least a portion of the at least first pin being receivable in the locking hole;

the at least first securing apparatus being structured to resist movement of the door with respect to the case when at least a portion of the at least first pin is received in the locking hole;

the support being connected with the anchor plate and being mounted on the portion of the case;

the case including a flange;

the support including a first bracket and a second bracket;

the first bracket and a second brackets each being connected with the anchor plate and being mounted on the flange;

the first bracket and a second brackets being disposed on opposite sides of the slot;

the first bracket and a second brackets each including a flange plate;

the flange plates being oriented substantially parallel with one another;

the flange being disposed between the flange plates;

the first bracket and a second brackets each including a connection plate;

the connection plate of each of the first and second brackets being oriented substantially perpendicular to the flange plate thereof; and the connection plates being fixedly mounted on the anchor plate.

* * * * *